July 2, 1940.  W. H. OSBORN ET AL  2,206,117
RECOVERY OF METAL VALUES FROM FUME DEPOSITS
Filed March 3, 1938   3 Sheets-Sheet 3
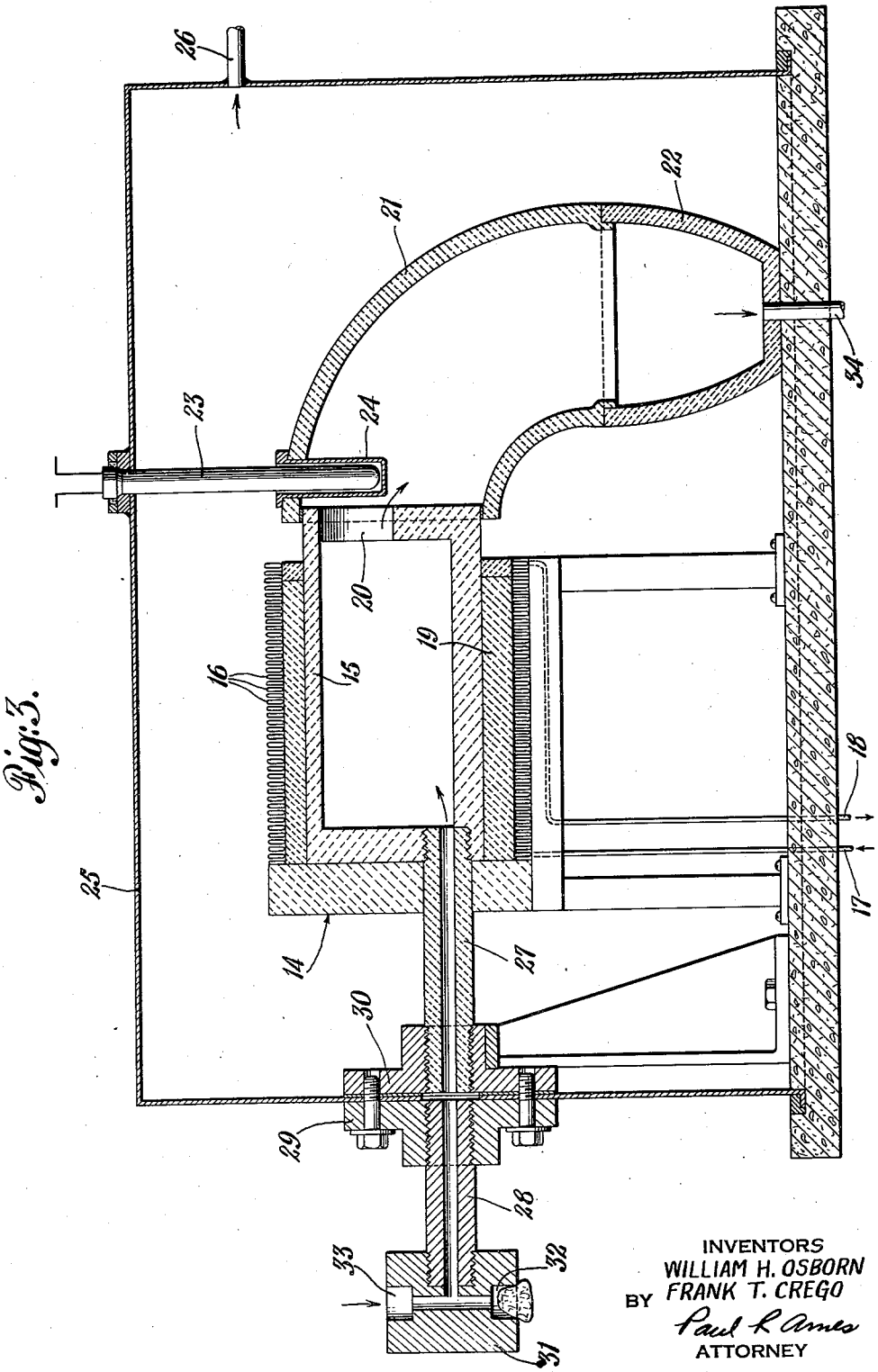
INVENTORS
WILLIAM H. OSBORN
BY FRANK T. CREGO
Paul R. Ames
ATTORNEY Patented July 2, 1940

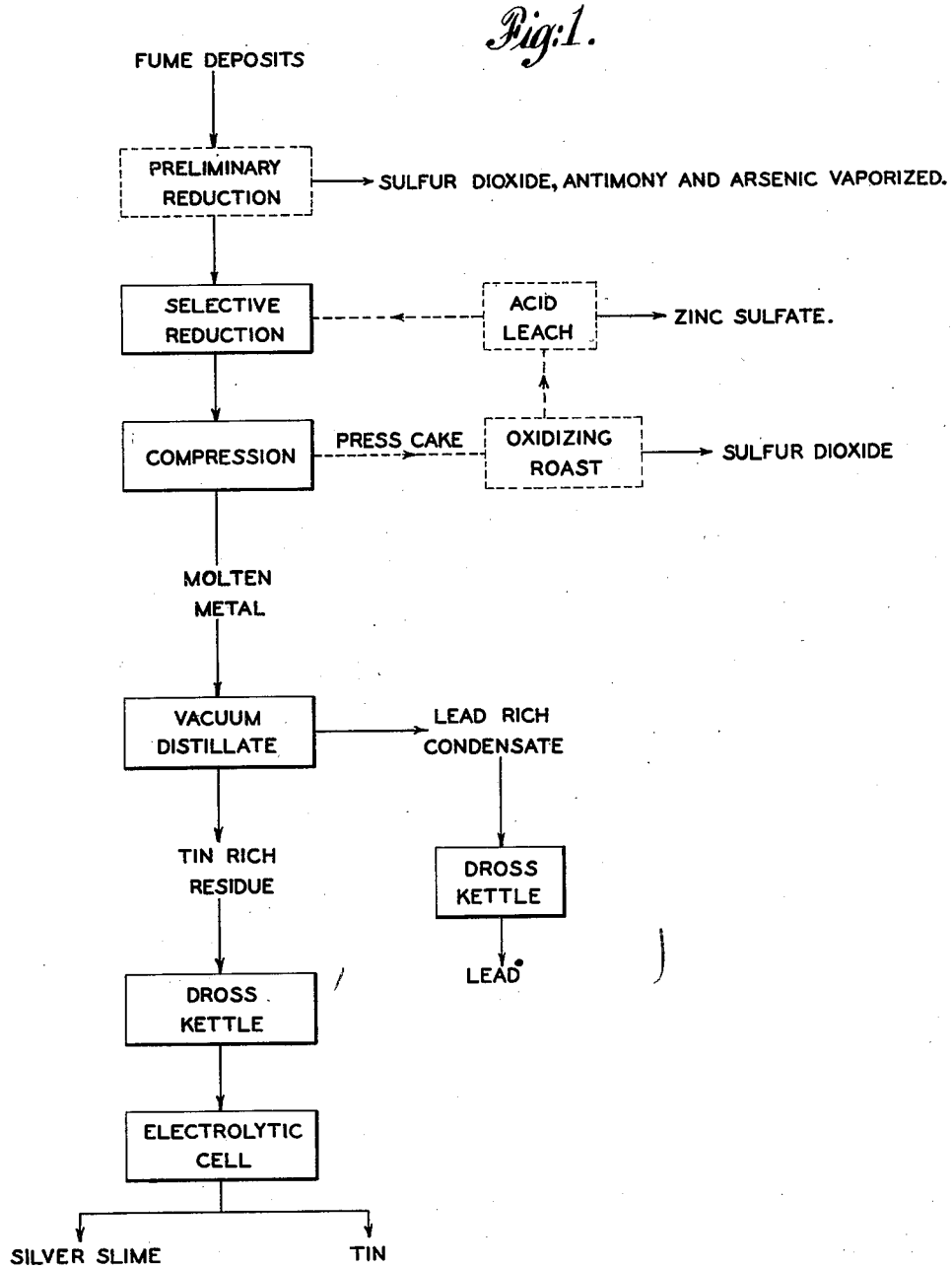

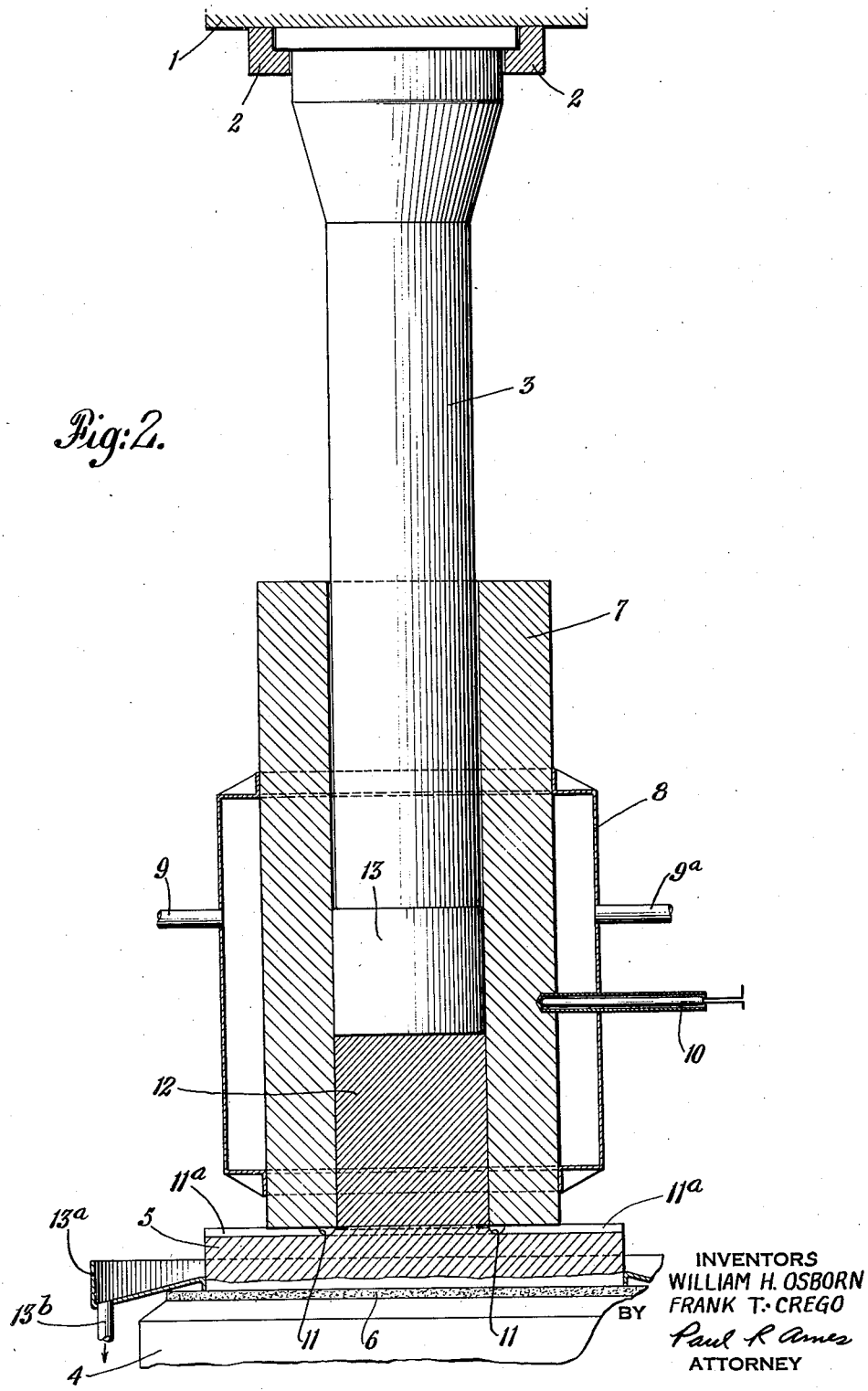

2,206,117

UNITED STATES PATENT OFFICE 2,206,117

RECOVERY OF METAL VALUES FROM FUME DEPOSITS

William H. Osborn, New York, and Frank T. Crego, Long Island City, N. Y., assignors to Phelps Dodge Corporation, New York, N. Y., a corporation of New York Application March 3, 1938, Serial No. 193,672

23 Claims. (Cl. 75—25)

This invention is particularly useful in the recovery of metal values from fume deposits (commonly referred to as fumes or fume residue) containing tin, lead, zinc, antimony, arsenic, and other similar volatizable metals which may originate, for example, in the smelting of ores or scrap metals, and are generally collected in a baghouse or in Cottrell electric precipitators, or by other means. It may also be applied to other alloys or mixtures of metal values containing some or all of those elements.

Bag-house fume deposits usually contain tin as tin oxide or dioxide; lead as lead oxide and/or lead sulfate; zinc as zinc oxide and/or zinc sulfate; antimony, arsenic and bismuth as the oxides of these elements and copper and iron as entrained metals or compounds of these metals. The usual methods of treating such materials involve either the separation of the various metallic ingredients by wet methods or by smelting and fluxing, or by a combination of both. In general, it may be said that such methods are costly and complicated and involve a large circulating load of partly treated material.

It is an object of the present invention to provide an improved method for recovering such metal values. It is also an object to provide a method whereby the various metals may be more completely and expeditiously separated from each other. It is another object to provide a method for uniting and removing discrete particles of molten metal from mixtures of discrete particles in a solid mass or in a powdered material. Another object is to provide a procedure in which a more complete separation of antimony from the tin may be readily obtained. It is also an object to provide a method including the separation of metals by vacuum distillation. Other objects will become apparent.

In the drawings, Figure 1 is a flow sheet illustrating the improved procedure.

Figure 2 is a side elevation of the means for compressing the reduced mass, portions of the device being shown in section.

Figure 3 illustrates a vertical, longitudinal section at the middle of a form of apparatus suitable for carrying out the vacuum distillation.

When mixtures of oxides of different metals, such as occur in fume deposits or mixtures of oxides of different metals with other non-reacting substances, are subjected at elevated temperatures to the action of hot reducing gases (or of mixtures of hot gases in which reducing gases are included, and in such concentrations of the reducing gas that the oxides of some of the metals, but not of all of the metals present in the mixture, will be reduced to a metallic state), the gaseous reduction which takes place may yield a product consisting of small pellets of reduced metal dispersed among the particles of the unreduced metal oxides or of the inactive foreign material. Under such circumstances these pellets of reduced metal will not run together into a solid mass of molten metal unless the whole mass of material is raised to temperatures so far above the actual melting point of the metal or metals that the result is similar to what would have been accomplished by direct smelting.

It has now been found that, if such fume deposits are subjected to gaseous or other reduction, for example, with hydrogen or carbon monoxide or hydrocarbon gases, or combinations of these, or with solid carbonaceous reducing agents, so that the tin and lead are reduced, in a large part, to the metals and are present in the form of small discrete pellets in the unreduced metals or inactive foreign materials, and this material is subjected to pressure in a mold, such as the container of a hydraulic press, at a temperature in excess of the melting point of the reduced metals of the mass and below the melting point of the remainder of the mass, the individual pellets may be made to flow together into larger masses of molten metal and may be extruded through apertures in the container and collected as molten bullion. The unreduced metals, consisting of the oxide or sulfide of zinc, and of any of the other metals not completely reduced to the metallic state, will remain in the container, together with the inactive foreign materials, as a cake which may be ejected after the molten metals have been extruded from it.

The cake resulting from this extrusion may then be given an oxidizing roast to drive off any combined sulfur and may be recycled through the gaseous reduction and compression steps. If the zinc oxide content of the cake residue, after the oxidizing roast, is sufficiently high to warrant its recovery, it may be extracted by leaching in acid, after which the residue from the leaching step may be recycled through the reduction and compression steps.

The metallic bullion obtained by gaseous reduction, followed by compression, as described above, will contain those metallic elements which are reduced by the gases or other reducing agent used, in about the same proportion as they were in the original fume deposit. In order to effect separation of these metallic elements from each other, and especially the tin from the lead, the metallic bullion may be subjected to a high temperature in a partial vacuum, whereby the lead and other more volatile metals may be separated from the tin, leaving a residue of a tin enriched bullion. For example, by heating a bullion, containing approximately 69.0% tin and 19.8% lead, 0.53% bismuth, 0.5% arsenic, and 8.4% antimony, to approximately 2600° F. at a pressure of 14 millimeters of mercury, a residue was obtained running about 90.8% tin, 0.7% lead, and 6.3% antimony and 0.15% bismuth, and a condensate containing 90.03% lead, 7.10 bismuth, 1.57% antimony and 1.63% tin. A more complete separation of the lead and tin may be obtained by using a higher vacuum and/or a higher temperature, up to the temperature and vacuum at which substantial quantities of tin are vaporized. The degree to which it is found advisable to separate these metals by distillation is a question of economic balance with the cost of final refining either by electrolysis or by other conventional means.

In carrying out this distillation, the tin, lead, antimony and other metals present in the bullion exist in the molten state at temperatures such that they may be pumped readily in and out of the vacuum chamber, thus avoiding the necessity of breaking the seal of the vacuum furnace every time a new batch of metal is distilled. Therefore, the molten mass of tin, lead, antimony, etc. may be pumped or syphoned into the vacuum chamber, subjected to a distillation at high temperature and the lead distilled off may be condensed while maintained under a vacuum. When the distillation is complete, the tin rich residue and the lead rich distillate may be separately piped or syphoned out of the vacuum chamber before repeating with a new batch. In this manner neither the heat content of the vacuum furnace chambers nor the vacuum seal is lost, and good thermal and mechanical efficiency of operation may be maintained. By providing suitable means for continuously withdrawing the condensed distillate and residue the vacuum distillation may be conducted as a continuous operation.

If a fume deposit (or other material being treated) containing appreciable quantities of lead present as lead sulfate is treated by reducing gas in sufficient concentration to reduce to metal the metal oxides of the metals to be removed by compression, a part of the lead sulfate will be reduced to lead sulfide and will not flow out as molten lead on being subjected to pressure in the compression step.

Also, antimony contained in the fume deposit will be separated by compression with the molten metals and will not be separated from the tin by distillation as easily as the lead and bismuth present. Hence, if antimony is present in sufficient quantities, a tin residue that is so rich in antimony as to be difficult to purify may result after distillation. Thus, in many cases it is advisable to remove or substantially reduce the amount of antimony and/or sulfur in the fume before subjecting it to the reducing treatment described.

If a fume deposit or other material containing lead sulfate is treated at an elevated temperature to a mixture of a reducing gas and a gaseous product of oxidation of the reducing gas (steam if hydrogen is used or carbon dioxide if carbon monoxide is used), in such proportions that the lead sulfate will be reduced to sulfite without reducing it to the sulfide (i. e., the $SO_3$ of the sulfate radical will be reduced to $SO_2$ without reducing the $SO_2$ to S), sulfur dioxide will go off as a gas and the sulfur content of the charge will be substantially eliminated.

Similarly, antimony present as the relatively non-volatile tetroxide ($Sb_2O_4$), if subjected to a mixture of a reducing gas and the gaseous product of the oxidation of this reducing gas in such proportion that the relatively non-volatile tetroxide will be reduced to the relatively volatile trioxide, without reducing the trioxide to metallic antimony, the antimony trioxide will be volatilized and carried off.

Thus, as indicated above, the improved procedure may include the following principal steps:

First: The controlled selective reduction of the charge at temperatures below the fusion point of the metallic and other compounds which it is not desired to reduce to metal.

Second: The pressing of the charge so as to squeeze out the reduced metals in the form of a molten bullion.

Third: Separation by distillation in partial vacuum of the principal elements of the bullion so as to bring both the distillate and the residue to a degree of purity sufficient to make it economical to subject them to methods of final purification generally used in the art.

If desired, sulfur and antimony may be removed as a preliminary step in the treatment of the material by an initial reduction of the material under conditions such as to remove sulfur and antimony. This may be followed, directly or as a separate step, by the selective reduction to reduce to metal the elements to be separated by the compression step. Also, if desired, the press cake residue from the compression step may be recycled through the reduction and compression steps, the press cake being subjected, before recycling, to an oxidizing roast to remove sulfur and/or to a leaching operation to remove excess zinc oxide, if the concentration of these substances makes it economical to do so.

The time of treatment during the initial and main selective reduction steps will depend upon the surface of the material exposed and the rate of flow of gas over this surface. In any case, sufficient time must be permitted, under any given surface and gas flow rate conditions, to bring the desired reaction to completion.

These various steps may be carried out with different types of apparatus and with various refinements of technique which may be called for by the particular circumstances of the operation. For example, in the step of selective reduction the charge may be handled in a number of different ways:

(a) It may be placed in trays or plates and conveyed or pushed through a closed-system furnace, using appropriate gas seals at both the entrance and exit ends of the furnace.

(b) It may be fed into a furnace by a screw conveyor, charging hopper or other means and moved through the reducing furnace by means of mechanical rabble arms of any conventional type.

(c) It may be carried through a rotary kiln type of furnace.

The choice of these several types of furnace units or others, is governed largely by cost and economic factors.

This controlled selective reduction step should be carried out under reducing conditions such as to reduce to metal the materials to be expressed in the compression step and such as to avoid reducing the remaining materials. Where fume deposit is treated, the reduction should be such as to reduce the tin and lead to metal and to avoid reducing the zinc oxide to metal.

The minimum temperature during such reduction should be that at which the desired reduction will take place at an economical rate of speed. The maximum temperature is determined by the point at which the unreduced portions of the charge tend to sinter or agglomerate. Temperatures from 1250° F. to 1550° F. have been found suitable in the reduction of fume deposit.

The control of the selective reduction step may be accomplished by control of the ratio of reducing gas present to the oxidized product of that reducing gas present in the reducing gas mixture. Hydrogen or carbon monoxide will only reduce zinc oxide to zinc metal or vapor when no more than minute percentages of water vapor or carbon dioxide are present in the gas mixture. In the reduction of the oxide of tin by hot reducing gases, the ratio of water vapor to hydrogen or of $CO_2$ to $CO$ may considerably exceed unity at temperatures between 1300° and 1600° F. and still give conditions which are reducing to tin. Similar proportions are also found to be reducing to the oxides of lead. For the purposes of reducing the oxides of tin and lead without the reduction of the oxides of zinc, it is therefore obvious that any ratios of the oxidized product of a reducing gas to the reducing gas may be used within the very wide limits between the ratio at which zinc oxide will first be reduced and the ratio at which the oxides of lead and tin will no longer be reduced. Various gases containing reducing gas, such as water gas or producer's gas may be used for such reduction. Inert gases may also be present or added to better control the rate of reduction, if that is desired.

If desired, instead of passing a preformed mixture of reducing gas countercurrently over a movement of the material to be reduced through an externally heated furnace, reduced carbonaceous matter, such as crushed coke, may be added to the material to be selectively reduced and a hot flame may be passed over it in the direction of flow of the material. The products of combustion of the flame, namely, $CO_2$ gas and $H_2O$ vapor, will react with the carbonaceous material to form carbon monoxide and hydrogen, which in turn will react with the metal oxides to be reduced. If the amount of coal added is such that it will be completely consumed by the oxidized gases of the flame, the material can be reduced and made ready for treatment in the press without the use of muffled externally applied heat.

The pressing out of the reduced material may be done, for example, by either of two general methods:

(a) The material, preferably hot from the reducing furnace, may be fed into a suitable press, such, for example, as that illustrated in Figure 2. This press includes a stationary head 1, having ram slides 2 adapted to carry the stationary ram 3, a movable ram 4, a press plate 5 and a plate 6 of heat insulating material, such as asbestos, adapted to withstand the pressures applied. A cylinder 7 is loosely positioned around the ram 3 and rests upon the press plate 5. The cylinder 7 is surrounded by a heater casing 8 which may be heated by electric resistance wire or by a gas ring burner or by steam inlet and outlet pipes 9 and 9a. A thermocouple 10 may be provided to indicate the temperature of the cylinder 7. Annular and radial grooves 11 and 11a are provided in the press block 5 for the escape of the molten metal.

The charge 12 is placed in the preheated cylinder 7 and a dummy block 13, of such a size as to provide a close fit with the walls of the cylinder, is placed on top of the charge. The pressure is then applied by raising the ram 4 and the molten metal is extruded under the cylinder 7 and out the grooves 11 and 11a. Any suitable means may be provided for collecting the molten metal. For example, it may be collected in an annular tray 13a having an outlet 13b.

After the molten metal has been squeezed out the press cake may be ejected from the cylinder 7 by removing the press plate 5, supporting the cylinder 7 on the ram 4 so that the lower end of the cylinder is open and raising the ram 4 to advance the cylinder 7 along the ram 3. The ejected cake is then ready for further treatment. The ram 4 may be depressed to remove the cylinder 7 from the ram 3, the plate 5 returned, the heated cylinder filled with a new charge and the operation repeated. To increase the speed of these operations a series of cylinders may be simultaneously filled, pressed and ejected.

(b) Or, the reduced material may be briquetted, while cold, into a shape which will fit into the cylinder of the hot press. The briquette may then be passed into a conventional heating furnace operating preferably in a reducing atmosphere and, when heated to the desired temperature, may be dropped into the cylinder of the hot press to be subjected to pressure to squeeze out the reduced metal. The resulting cake may be ejected as described above.

The choice between these two methods depends on factors of tonnage required, cost of equipment, cost of heat, etc.

By the application of pressure in the methods described above, the discrete particles of molten metal are caused to coalesce into a continuous phase, which phase is separated from the solid portion by the hydraulic pressure applied to the coalesced particles. Obviously, these procedures may be used in the separation of other molten, normally solid, discrete particles, and other means and methods may be used in the separation of the molten bullion from the unreduced metal.

The amount of molten bullion squeezed out of the mass may be increased by adding to the reduced material a small quantity of an oil or wax before pressure is applied. For example, the addition of 1% paraffin wax to the reduced material before heating and pressing was found to increase the recovery of molten bullion from approximately 78% to approximately 89.5% of the total reduced metal in the mass.

The temperatures and pressures applied during this separation may vary, depending upon the material being treated and the degree of separation desired. The temperature of the reduced metal may be between that at which all or part of the constituents which have been reduced to metal are molten and that at which the constituents which have not been reduced to metal (such as zinc oxide, zinc sulfide, etc.) begin to be molten. In general, it is found that greater extraction occurs as the temperature is increased above the minimum melting point of the metals to be removed. This again is a question of economic balance. Temperatures of 700 to 1100° F. give excellent results in the treatment of fume deposit.

The pressure used will depend upon the temperature and the equipment used. The minimum pressure will be that at which a satisfactory amount of metal will flow out of the mass and the maximum will be limited by the strength of the materials through which the pressure is exerted. With a hollow cylindrical device as described above, pressures of 8000 to 30,000 pounds per square inch have been found advantageous in the treatment of fume deposit.

This separation by reduction and compression may also be applied to the separation of other metal values, for example, in the separation of iron from tin in cassiterite, the cassiterite may be selectively reduced to reduce the tin oxide to metal and the iron oxide to a suboxide. The mixture may then be compressed, at a proper temperature, to squeeze out molten tin and leave the iron suboxide in the press cake.

The separation by vacuum distillation may be carried out in any apparatus in which the desired temperatures and vacuum may be applied and preferably one in which the molten charge may be pumped or siphoned into the distillation chamber and in which the molten residue and distillate may be pumped or siphoned out of the distillation chamber and condensation chamber, respectively.

Figure 3 illustrates a device suitable for this purpose, although it is not intended to restrict the invention to such an apparatus. Because of the low melting point of the metals being separated, they can be pumped into any or out of any suitable vacuum apparatus and so render the breaking of the vacuum seal between lots unnecessary. In the device shown in Figure 3, the numeral 14 indicates the still provided with a graphite lining 15. This lining is heated by an Ajax Northrup high frequency coil 16 consisting of a continuous hollow copper tube wound in the form of a helix and connected at one end with the inlet pipe 17 and at the other end with an outlet pipe 18, through which water is circulated during the heating operation. This tube 16 is also connected to a high frequency power line whereby it is energized to supply the impulses that are absorbed and transformed into heat by the metallic or carbonaceous material to be heated. This coil 16 is separated from the graphite lining by a powdered or granulated high temperature refractory material 19 which serves as a heat and electrical insulation. If desired, suitable heat insulation material may be applied to the outside of the still. At one end of the still, the graphite lining 15 is provided with an outlet opening 20 communicating with a condenser neck 21 which surrounds the end of the lining 15 and communicates with a receiver 22, which may be a crucible of clay or cast iron.

A thermocouple 23 in a graphite well 24 serves to indicate the temperature between the distilling and condensing portions of the apparatus. The entire still and condenser are enclosed within an hermetically sealed enclosure 25 connected at 26 with a vacuum pump (not shown) so that the entire apparatus may be put under a partial vacuum. This enclosure 25 may be made of brass or bronze sheeting or other suitable material.

The molten charge may be pumped into the still 14 through the inlet pipe, made up of a graphite tube 27 within the enclosure 25, and the cast iron tube 28 outside of the enclosure. These tubes may be retained in position by a flange 29 of bronze or other suitable metal brazed to the outside of the casing 25 and a flange 30 of nickel cast iron, or other suitable material, bolted to the flange 29. A cast iron T connection 31 may be provided at the outer end of the tube 28.

When the molten material is being charged into the still the lower outlet 32 can be plugged or otherwise closed and the molten tin, lead, etc. metal may be fed in through the upper opening 33. After the still is charged, the opening 33 may be plugged or otherwise closed. When the distillation is complete, the lower plug 32 may be removed and the residue of tin rich metal may be removed through that outlet. A discharge pipe 34 may connect with the receiver 22 so that the lead rich condensate may be withdrawn through it.

With this apparatus the molten charge can be introduced into the still and the molten residue and condensate may be withdrawn without breaking the vacuum applied to the apparatus. If desired, the inlet and outlet tubes may be so arranged that the still may be operated continuously, the material to be treated being pumped in at one end of the still, the tin rich residue being pumped out at the other end of the still and the condensate being withdrawn from the vessel 22.

It is obvious that other types of apparatus may be used for this purpose.

The temperature of the molten metal in the still and the vacuum may be adjusted to obtain the desired separation of the lead and other volatile metals from the tin. The minimum temperature for any given vacuum is the temperature in which the lead may be separated from the tin at an economical rate of speed and the maximum temperature for any given vacuum is limited by that point at which tin will commence to distil over with the lead. The maximum vacuum is that which is economical to maintain within the limits of the pumping and vacuum seal equipment. The minimum vacuum (maximum pressure) is set by that at which separation of the tin and lead will be effected at an economical rate of speed and which will not exceed the physical limitations of the distillation and condensation apparatus used. The separation may be effected at atmospheric or even higher pressures in an inert or non-oxidizing atmosphere, but very high temperatures are required for such a separation. With the vacuum distillation the separation may be accomplished more economically and at lower temperatures. In practice in the treatment of mixtures of tin and lead, such as those recovered from fume deposits by the procedures described above, temperatures of about 2300° to 2700° F. with absolute pressures of about 10 to 15 millimeters of mercury have been found satisfactory. At .1 millimeter of mercury the boiling point of lead is in the neighborhood of 1200° F. and that of tin is 800° or 900° F. higher. Commercial vacuums less than 0.1 mm. of mercury can very easily be obtained with no excessively expensive apparatus and because of the much lower temperatures that can be used, the economic balance may make the high vacuum pump and the low temperature apparatus more suitable than a relatively low vacuum pump and a higher temperature apparatus.

The above described process and apparatus may also be applied to the separation of other metals having melting points such that they may be pumped into and out of the distilling and condensing apparatus. For example, by proper regulation of the temperature and vacuum, lead or antimony may be separated from bismuth in a similar manner. Also, with proper regulation of the temperature and vacuum, a multiple stage distillation may be used to separate the various metals.

The following is an example of the various procedures described above:

138 grams of fume deposit or oxide material were reduced at about 1400° F. with hydrogen gas diluted with steam, the ratio of steam to hydrogen gas being about .85 to 1.00 by volume. This material contained the following percentages of metals (combined as oxides, sulfates, etc.):

| | Per cent |
|---|---|
| Tin | 40.33 |
| Lead | 10.8 |
| Zinc | 11.0 |
| Arsenic | 1.24 |
| Antimony | 5.78 |
| Bismuth | .8 |
| Sulfur | 3.05 |

From this treatment 105 grams of reduced material were obtained, analyzing as follows:

| | Per cent |
|---|---|
| Tin | 53.1 |
| Lead | 14.2 |
| Zinc | 14.5 |
| Arsenic | 1.1 |
| Antimony | 7.6 |
| Bismuth | 1.1 |
| Sulfur | 4.0 |

The reduced metal was heated to about 700° F. and subjected to a pressure of about 12,000 lbs. per square inch, yielding 65 grams of molten bullion containing:

| | Per cent |
|---|---|
| Tin | 70.6 |
| Lead | 20.9 |
| Arsenic | .94 |
| Antimony | 6.95 | and 35 grams of cake residue containing:

| | Per cent |
|---|---|
| Tin | 28.3 |
| Lead | 5.4 |
| Zinc | 33.9 |
| Arsenic | 3.9 |
| Antimony | 7.3 |
| Sulfur | 9.7 |

This cake was roasted to eliminate sulfur and gave a roasted cake weighing 38 grams and containing:

| | Per cent |
|---|---|
| Tin | 26.1 |
| Lead | 5 |
| Zinc | 31.2 |
| Sulfur | .12 |

11 grams of zinc oxide were leached from this roasted cake with dilute sulfuric acid solution, leaving a leach residue of roasted cake weighing 27 grams. This leach residue was reduced in the same manner as the original material and gave a product weighing 20 grams and containing:

| | Per cent |
|---|---|
| Tin | 50.7 |
| Lead | 8.6 |

On being subjected to pressure this yielded 12 grams of bullion containing:

| | Per cent |
|---|---|
| Tin | 68.45 |
| Lead | 13.7 | and 8 grams of cake residue containing 24.5% tin.

The bullion was distilled at 2600° F. and 35 millimeters of mercury pressure and yielded a tin rich residue containing about 88% tin and a lead rich distillate containing about 81% lead.

Thus, with one recycling operation, from the original reduction and pressing, 96.5% of the original oxide tin content was pressed out into bullion.

The tin-rich residue may be treated by any conventional means, such as electrolysis, to raise its final purity to the desired limits. The lead-rich condensate may also be treated by any conventional means to raise its purity to the desired limit.

When the separation of antimony and/or sulfur is desirable, the exact proportion of hydrogen to steam or carbon monoxide to carbon dioxide necessary to remove sulfur as sulfur dioxide or antimony as antimony trioxide will vary with the conditions of temperature and rate of gas flow, surface exposed, etc. The minimum amount of reducing gas in proportion to its oxidized constituent is that at which, under conditions of absolute equilibrium for a given temperature, the desired reactions will take place. The maximum amount of reducing gas in proportion to its oxidized constituent at any given temperature, and in any given proportion in excess of that required for absolute equilibrium, is determined (within factors of time, rate of flow of gas, surface of material exposed to the gas, etc.) by the maximum concentration at which sulfide lead or elemental antimony will not be formed.

The minimum temperature is that at which the desired reactions will take place and the maximum is that at which it is found economical to operate.

In the treatment of fume deposits, temperatures from 1400° F. to 1600° F. and a proportion of hydrogen to steam, or of carbon monoxide to carbon dioxide or mixtures of these two, in the order of one part of reducing gas to 100 parts of its oxidized constituent up to one part reducing gas to 3000 parts of its oxidized constituent, are suitable.

The same proportions and conditions which are effective in removing sulfur are also effective in removing antimony. They will also lead to volatilization and removal of much of the arsenic content of the material treated.

By following this procedure a fume deposit which contains tin, lead, etc. and 1.24% arsenic, 5.78% antimony and 3.05% sulfur, gave, after treatment for three hours at 1500° to 1600° F. in an atmosphere consisting of about one part of hydrogen to 3000 parts steam, a product containing 0.26% arsenic, 1.82% antimony and 0.03% sulfur.

In another case a material containing 11.84% tin, 34.86% lead, 1.97% antimony, 1.35% arsenic and 7.92% sulphur was treated at 1500° to 1550° F. to a flow of steam plus hydrogen, in the proportions of about one part in 1500 of steam for 4½ hours. The resultant product contained 0.107% antimony, 0.76% arsenic and 1.73% sulfur.

Instead of bringing the charge containing $Sb_2O_4$ or $SO_4$ radical into contact with a predetermined proportion of reducing gas and the gaseous products of the oxidation of the reducing gas, it is possible to subject the charge to such an initial reduction with either a solid or gaseous reducing agent that partial reduction to metal or to sulfide sulfur occurs and then, by subjecting the charge to contact with hot oxidizing gas such as air, or the products of combustion of fuel with an excess of air, to reoxidize the reduced portions of the charge and cause $Sb_2O_3$ to be formed which will be votalized and sulfide sulfur to burn to $SO_2$ which will escape as gas.

As an example of such an alternate procedure, coal in the form of fine particles of anthracite may be added to the charge, before treatment, in sufficient quantity that when the charge is heated with the hot oxidizing gases formed by combustion of fuel with an excess of air, the coal will react with the charge to partially reduce it and as the coal is consumed the charge will be reoxidized by the hot flame. By this means both sulfur and antimony can be driven off, both as the charge reduces and further as it reoxidizes.

The product treated to remove antimony and sulfur by the above described procedures may be subjected to reducing, compressing and distilling steps, as described above, with the resultant production of a purer tin residue in the distillation step.

In the improved procedure described, including the preliminary step of separating sulfur and antimony, there are three different groups of substances calling for widely separated ratios of reducing gas to the oxidized reducing gas. the first group includes the oxides of sulfur, arsenic and antimony, with which only a small proportion of reducing gas is necessary to bring about the desired reduction to the volatile product. The second group includes the oxides of tin, lead and antimony group, with which approximately equal proportions of reducing gas to oxidized reducing gas bring about the desired reduction to metals. The third group includes the zinc oxide, with which the reduction to metal will be inhibited by the presence of more than minute amounts of the oxidized product of the reducing gas. Of course, the reduction may be controlled in other ways than those described above, to give the desired results in the removal of sulfur and antimony and in the selective reduction of portions of the charge to metal.

If desired, the initial reduction described above for removal of sulfur and antimony may be followed immediately by the main selective reduction. For example, the charge may be passed through one section of a reducing furnace in which it is subjected to conditions such as to remove the sulfur and antimony and then into a section in which it is subjected to the selective reduction to produce the discrete particles of molten metal. For example, a modified Herreshoff type of roasting furnace might be used in which one of the intermediate rabble arms is shortened to leave a sufficient bed of material to provide a seal between the upper and lower portions of the furnace. The material to be treated could be introduced at the top and a mixture of the reducing and the oxidized reducing gas in such proportions as to remove the sulfur and antimony could be introduced into the upper section. A mixture of the reducing and the oxidized reducing gas in such proportions as to reduce the tin and lead could be introduced into the lower section and the material could be discharged at the bottom. Any heat necessary for the reaction could be supplied by external heating or by preheating the gases.

It is obvious that the procedures and apparatus described above for the separation of sulfur and antimony and reduction of tin and lead may also be applied to other materials in which a similar separation or reduction is desired.

It is apparent that many variations can be made in the above procedure in utilizing the invention, and it is not intended to restrict it to the particular details described. For example, the various steps recited in the preferred operations described above may be used separately where only the effect of such separated steps is desired, or their order may be varied, or one or more of the steps may be eliminated where not necessary. For instance, when the fume treated is substantially free from unreducible impurities, the pressure squeezing may be omitted. Or, instead of separating the tin and lead from zinc oxide by the compression step, the zinc oxide might be removed by leaching the reduced material (particularly after the initial step for removal of sulfur) with dilute sulfuric acid to remove the zinc oxide. The residue might then be subjected to the vacuum distillation step. Also, the procedures may be applied to different materials of a similar nature. For example, the procedures may be applied to the reduction and separation of other metal compounds such as salts, oxides and sulfides of the metals. In such applications of the process, it is obvious that variations may be desirable in the temperatures, pressures, times, etc. in order to meet the particular requirements of such applications. The various conditions recited, such as the ranges of temperatures, pressures, proportions, etc., are given as illustrative and are not intended as limitations upon those conditions under which the invention might be used. The terms used in describing the invention have been used in their descriptive sense and not as terms of limitation, and it is intended that all equivalents thereof be included within the scope of the appended claims.

We claim:

1. A method of separating metals from mixtures of compounds thereof, which comprises subjecting the mixture to selective reduction to reduce one or more of the metal compounds to metal without reducing one or more of the other metal compounds to metal, and compressing the mixture, while maintaining it at a temperature above the melting point of the reduced metal and below the melting point of the unreduced compounds, to express molten metal from the mass of unreduced compound.

2. A method of separating metals from mixtures containing compounds of zinc and compounds of one or more of the group of elements consisting of antimony, arsenic, lead and tin, which comprises subjecting the mixture to selective reduction such as would reduce one or more compounds of the group consisting of tin compounds and lead compounds to metal without reducing the zinc compounds to metal, and compressing the mixture, while maintaining it at a temperature above the melting points of tin and lead and below the melting points of the zinc compounds, to express molten metal from the mass of unreduced compounds.

3. A method as claimed in claim 2 in which zinc is removed from the press cake formed by compressing the mixture and the residue of the press cake is returned to the mixture to be selectively reduced.

4. A method as claimed in claim 2 in which the press cake formed by compressing the mixture is leached to remove at least a portion of the zinc, and the residue of the press cake is returned to the mixture to be selectively reduced.

5. A method as claimed in claim 1 in which the press cake formed by compressing the mixture is subjected to an oxidizing roast.

6. A method as claimed in claim 1 in which the mixture contains compounds of sulfur and compounds of zinc and in which the press cake is subjected to an oxidizing roast to remove sulfur and is then leached with acid to remove zinc.

7. A method as claimed in claim 1 in which the material treated is fume deposit.

8. A method as claimed is claim 1 in which the reduced mass is maintained at a temperature above the melting point of the discrete particles of metals and below the melting point of the remainder of the material to provide separate liquid globules of metal as a dispersed phase, and sufficient pressure is applied to the mass to cause the liquid globules of metal to combine into a continuous phase and to extrude at least a portion of the said continuous liquid phase from the solid phase.

9. A method of separating metals from mixtures of compounds thereof, which comprises subjecting the mixture to selective reduction to reduce one or more of the metal compounds to metal without reducing one or more of the other metal compounds to metal, compressing the mixture, while maintaining it at a temperature above the melting point of the reduced metal and below the melting point of the unreduced compounds, to express molten metal from the mass of unreduced compound, and subjecting the expressed molten metal to vacuum distillation to separate constituents thereof.

10. A method as claimed in claim 9 in which lead is separated from tin in the expressed molten metal by continuously distilling and condensing the lead from the mixture containing tin and lead under less than atmospheric pressure, while flowing the molten mixture to the still and flowing the molten condensate and residue from the apparatus, all without breaking the vacuum.

11. A method of separating tin and lead from fume deposits in which the fume deposit is subjected to a gaseous reducing agent at elevated temperatures to reduce compounds of tin and lead to metallic tin and lead, compressing the mass while being maintained at a temperature above the melting point of tin and lead and below that of the unreduced materials and subjecting the extruded bullion to vacuum distillation to distil off lead.

12. A method as claimed in claim 9 in which the compound contains tin together with antimony tetraoxide and/or pentoxide, and in which antimony tetraoxide and/or pentoxide is reduced to antimony trioxide without reducing antimony trioxide to metal and the temperature is maintained such as to vaporize the antimony trioxide.

13. A method as claimed in claim 1 in which the material being treated contains lead sulfate, and the mixture is subjected to a selective reducing action such as to reduce the lead sulfate to lead sulfite without reducing it to sulfide, and the temperature is maintained such as to decompose the lead sulfite to lead oxide and volatile sulfur dioxide.

14. A method as defined in claim 1 in which the reduction is carried out in the presence of a mixture of a reducing gas and a product of oxidation of the reducing gas in such proportions as to give the desired selective reduction.

15. A method as claimed in claim 2 in which the mixture is subjected to a preliminary selective reduction in the presence of a concentration of reducing gas such as to reduce lead sulfate present to lead sulfite without reducing it to lead sulfide, and to reduce the antimony tetra- or pentoxide present to antimony trioxide without reducing it to antimony metal, and the mixture is thereafter subjected to selective reduction in a concentration of reducing gas such as to reduce tin and lead compounds present to metal without reducing substantial quantities of zinc compounds present to metal.

16. A method as claimed in claim 1 in which the mixture is subjected to a preliminary selective reduction while maintaining the temperature such as to vaporize reduced compounds.

17. A method as claimed in claim 1 in which the mixture is subjected to a preliminary selective reduction in the presence of a reducing gas and a product of oxidation of said reducing gas in such proportions and at such temperatures as to cause sulfur present to be fumed off as sulfur dioxide and antimony present to be fumed off as antimony trioxide.

18. A method as defined in claim 1 in which the selective reduction is in the presence of a reducing gas and a product of oxidation of said reducing gas in such proportions and at such temperatures as to remove sulfur, arsenic and antimony present by vaporizing of their compounds and without reducing antimony and sulfur compounds present to the elements.

19. A method as claimed in claim 1 in which a substance of the class consisting of oil or wax is added to the reduced mixture prior to compressing the mixture.

20. A method as claimed in claim 2 in which the selective reduction is conducted at about 1250 to 1550° F. and the compression at about 700 to 1100° F. and 8,000 to 30,000 pounds per square inch pressure.

21. A method as claimed in claim 2 in which the selective reduction is in the presence of a stream of a mixture of about .85 parts of steam to one part hydrogen at a temperature of about 1400° F. and the mixture is compressed at about 700° F. and 12,000 pounds per square inch pressure.

22. A method as claimed in claim 1 in which the mixture contains compounds of tin and oxides of antimony and in which the mixture of compounds is subjected to a preliminary selective reduction in which the oxide of antimony is reduced to animony trioxide without reducing the antimony trioxide to metal and the temperature is maintained such as to vaporize the antimony trioxide.

23. A method as claimed in claim 1 in which the mixture is subjected to a preliminary reduction in the presence of about one part of reducing gas to 100 to 3000 parts of oxidized reducing gas at about 1400 to 1600° F. to fume off sulfur present as sulfur dioxide and antimony present as antimony trioxide.

WILLIAM H. OSBORN.
FRANK T. CREGO.